(12) United States Patent
Brief

(10) Patent No.: US 7,753,330 B2
(45) Date of Patent: Jul. 13, 2010

(54) ADJUSTABLE ARTICULATED ARM FOR CELLULAR STANDS FOR USE IN VEHICLES

(76) Inventor: Yancu Solomovitz Brief, Cra 13A No. 23-38, Of 245, Parque Central Bavaria, Bogotá (CO)

( * ) Notice: Subject to any disclaimer, the term of this patent is extended or adjusted under 35 U.S.C. 154(b) by 0 days.

(21) Appl. No.: 11/992,857

(22) PCT Filed: Sep. 29, 2006

(86) PCT No.: PCT/IB2005/003177

§ 371 (c)(1),
(2), (4) Date: Mar. 31, 2008

(87) PCT Pub. No.: WO2007/036761

PCT Pub. Date: Apr. 5, 2007

(65) Prior Publication Data

US 2009/0272866 A1   Nov. 5, 2009

(51) Int. Cl.
*E04G 3/00* (2006.01)
(52) U.S. Cl. .............................. 248/278.1; 248/288.31; 248/288.51
(58) Field of Classification Search ............... 248/278.1, 248/276.1, 288.31, 288.51, 481, 483
See application file for complete search history.

(56) References Cited

U.S. PATENT DOCUMENTS

| 2,041,847 | A |   | 5/1936 | Marchand |
| 2,533,494 | A |   | 12/1950 | Mitchell |
| 3,409,317 | A |   | 12/1953 | Richards |
| 2,776,168 | A |   | 1/1957 | Schweda |
| 4,453,695 | A | * | 6/1984 | Sennott et al. ............... 248/660 |
| 4,674,523 | A |   | 6/1987 | Glatz |
| 4,735,388 | A |   | 4/1988 | Marks |
| 5,118,058 | A | * | 6/1992 | Richter .................... 248/183.2 |
| 5,664,746 | A | * | 9/1997 | Benzakarya ................. 248/106 |
| 2004/0195486 | A1 | * | 10/2004 | Rumsey et al. ............... 248/481 |
| 2009/0090831 | A1 | * | 4/2009 | Henning et al. .......... 248/278.1 |

FOREIGN PATENT DOCUMENTS

FR    1049044    12/1953

* cited by examiner

*Primary Examiner*—Ramon O Ramirez
(74) *Attorney, Agent, or Firm*—Dennison, Schultz & MacDonald

(57) ABSTRACT

A multi-directional mechanical jointed arm for supporting and suspending articles and its use as a free hand accessory, characterized by comprising at least three ball and socket joints, adjustable at any spatial position and direction providing a three-dimension movability and ability to hold suspended articles in a specific determined point selected at such space.

8 Claims, 7 Drawing Sheets

ADJUSTABLE ARTICULATED ARM FOR CELLULAR STANDS FOR USE IN VEHICLES

This application is a 371 of PCT/IB2005/003177 filed on Sep. 29, 2005.

BACKGROUND OF THE INVENTION

Jointed mobile arms for several purposes are known in the art. For instance and as examples only, there are jointed arms pliable into a sole plan which rotates on a perpendicular axle over such jointed arms plan. A variation of this embodiment is an arrangement of a first arm rotating on an axis at a plan and other connected to the end of the first arm rotating on a second plan. This system shows inconveniency of its difficult regulation and is easily submitted to lateral or vertical strengths which allow unexpected movements in any direction. In some restricted applications the so called "flexible tubes" are used, which consist of spiral corrugations coiled on them which offer certain flexibility degree in any direction but have a limited resistance and cannot be regulated. In other aspect, related with the application of the present invention to cellular telephones, so called "free-hands" phones are known, which consist of headphones and little microphones or other means to connect the cellular telephone to the vehicle sound equipment. Independently of the uncomfortable continuous use of an accessory put on the head, it is not least certain that such use prevent to feel environment sounds useful when driving a motor vehicle, such as other cars approximation or proximity, not observed through visual means. Other inconvenience is the cost of such devices, which surpasses possibilities of many users.

SUMMARY OF THE INVENTION

The main object of the present invention is providing an assembly which permits to hang up an auxiliary accessory, in particular in the situations where the user's attention is focused on other activities, but which require at the same time said auxiliary accessory. An example of this application is guided to dentistry where are required "third and fourth hands" for a "floating" or "suspending" suction mouthpieces used to gather, inside the mouth, salivation or water introduced through the hydro-milling tool.

An additional use is guided to the jewelry field where magnifying glasses are required as well as lighting accessories both focused on a determined point while the jeweler works on an object.

An additional application can include its use as a mini-tool support, such as used in milling-drilling artisanship operations.

The above mentioned applications must not be considered as limitative, because its application is also possible in other branches of science, technology or craftsmanship such as medicine, research, handwork or similar.

In the following description its use is particularly emphasized as cellular telephone accessory, when it is used during driving in such way that, after being installed in vehicles, drivers are able to use the cellular near their ear without driving interference, as they have both hands free to drive.

The device of the invention can be placed, within its action range, at any selected suspended position, to keep it on such position and when necessary to adjust required resistance to movement or displacement.

According to the above referred explanation it is a further object of the present invention to provide a ball joint arm having a suspended or floating end, which can vary when submitted to strengths exceeding to its own movement resistance.

Another object of the invention is to provide a ball joint arm able to be adjusted to offer a specified movement resistance, according to the intended use of the same.

An additional object of the invention in connection to its application on cellular telephones is to provide to a car driver, in position and driving operation, the ability to keep such telephone very close to the ear without hand intervention, once placed in position.

BRIEF DESCRIPTION OF THE DRAWINGS

Relating to the above figures it can be seen that the mechanical arm comprises three bodies having each one the ball joints from which derivates the several and multiple positions that assembly can obtain. Referring to FIG. 1, the ball joint body (2) comprises by way of the fingers forming slots (3) a spherical body (4) connected through a threaded shaft to a fixing support (1) with screws (30), which obviously can move angularly up to 90° or more when the shaft enters into slots (3), also having the capacity to rotate 360° over its own axis at any selected position.

Figure 1:
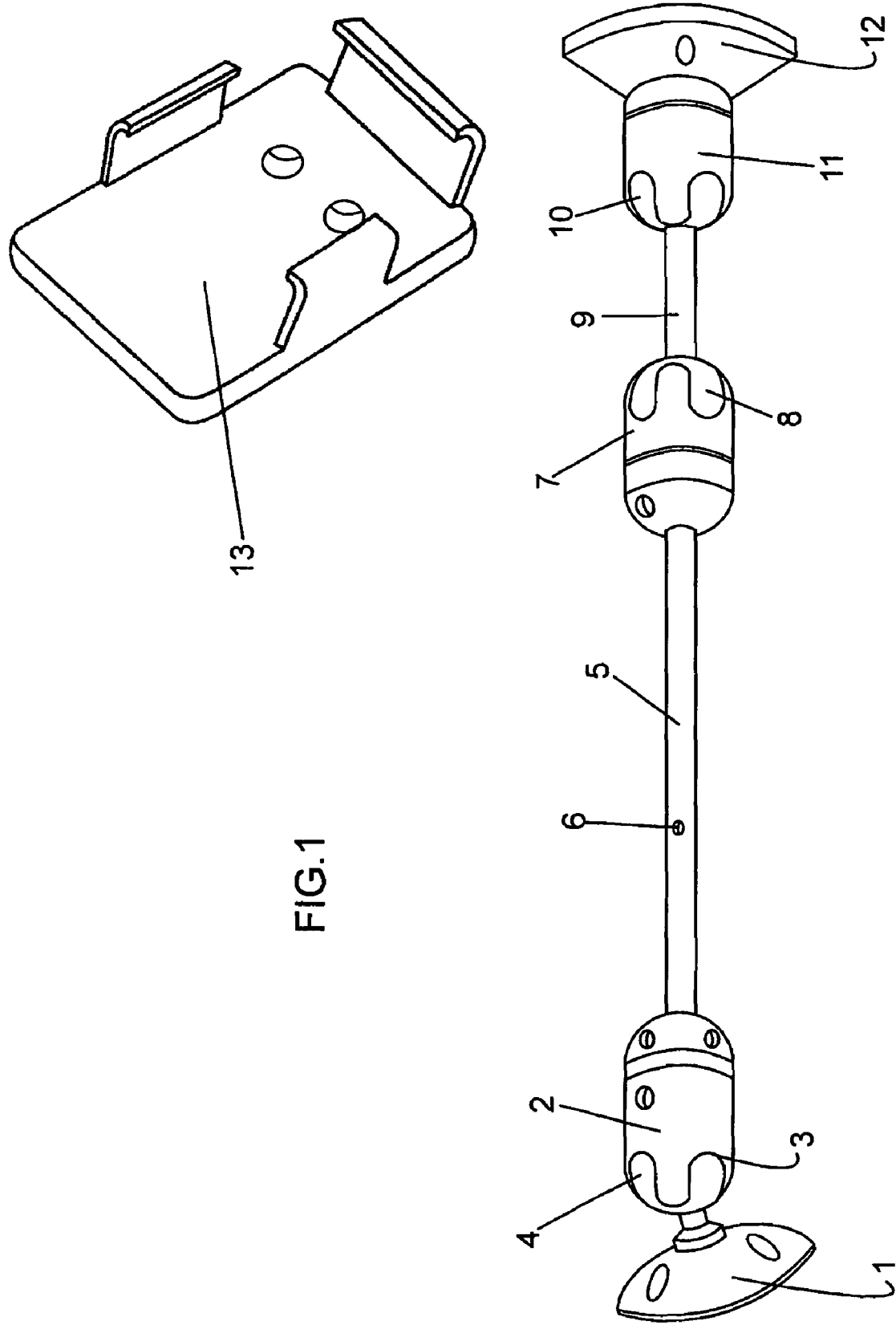
FIG. 1 is a perspective general drawing of the device assembly.

The ball joint (2) is integrally connected to a major rod (5) having a pass-over hole (6), where such major rod (5) is also fixedly connected to the body of the ball joint (7) which accommodates a spherical body (8) jointed to a minor rod (9) which in turn is joined to the spherical body (10) of the end ball joint (11) which in this case and through the mobile base (12) couples the cellular holder (13). This cellular holder (13) can be substituted by other piece adapted to the use or application foreseen to the mechanical arm of the invention.

Figure 2:
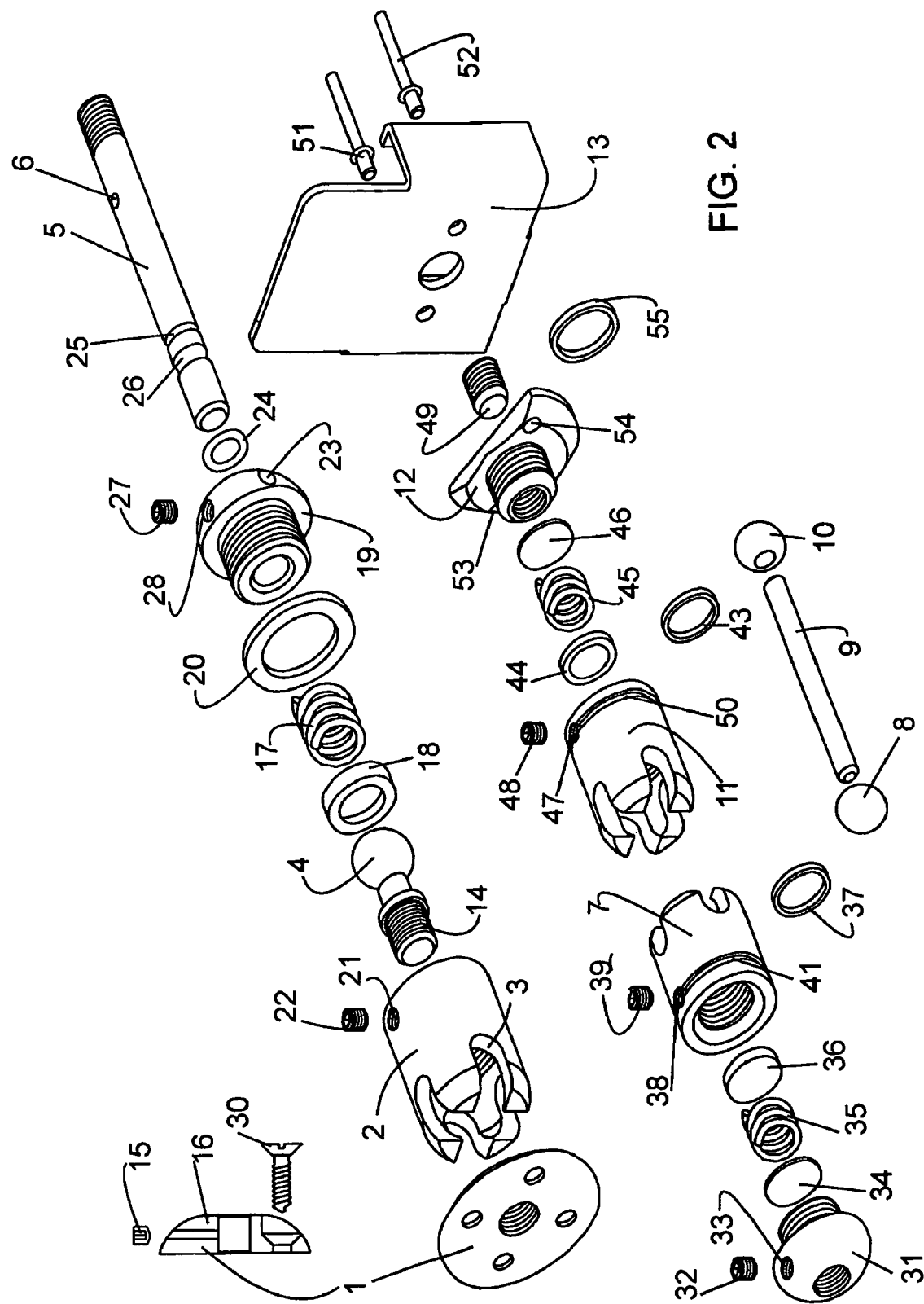
FIG. 2 is an exploded perspective drawing of the device.
Figure 3:
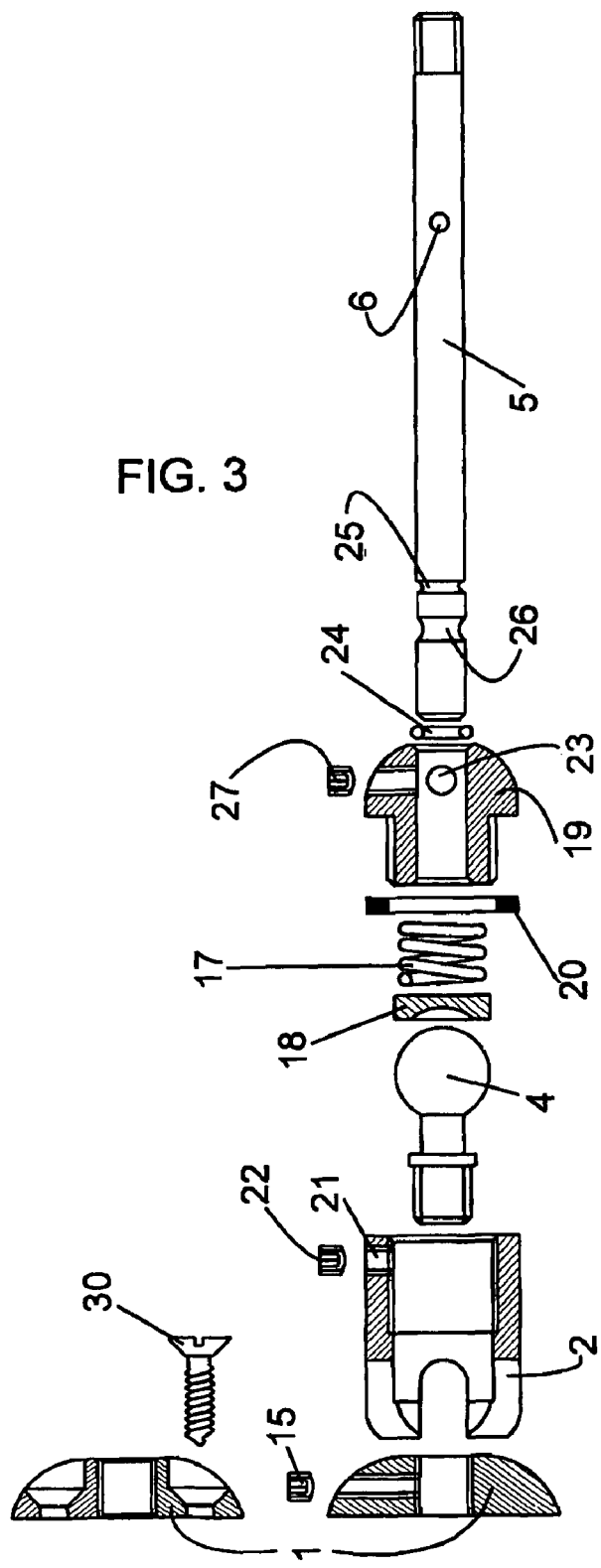
FIG. 3 is a longitudinal section view showing all the mechanical arm components.
Figure 3:
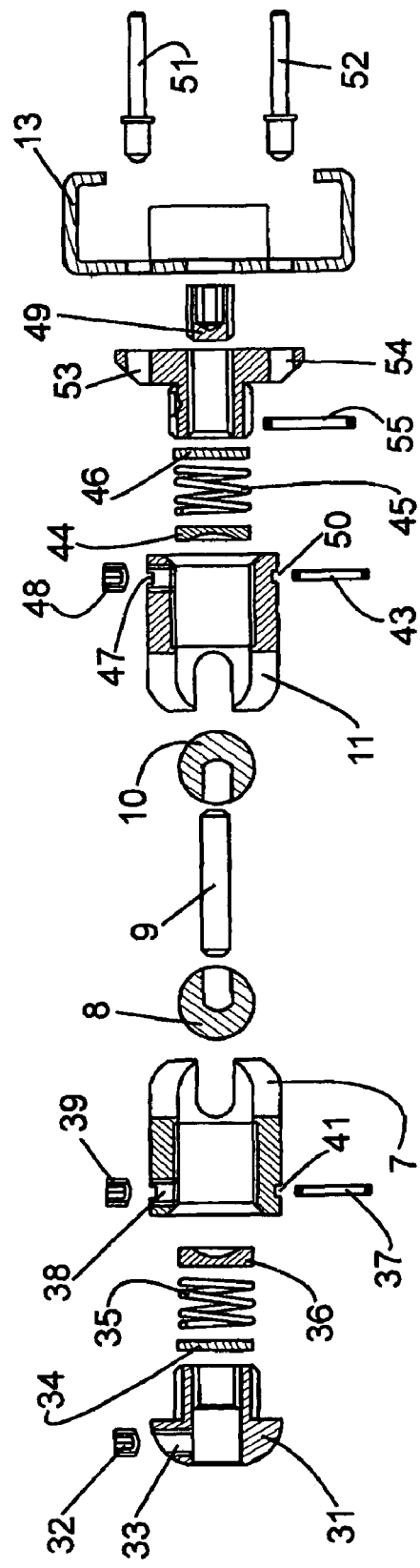
Figure 4:
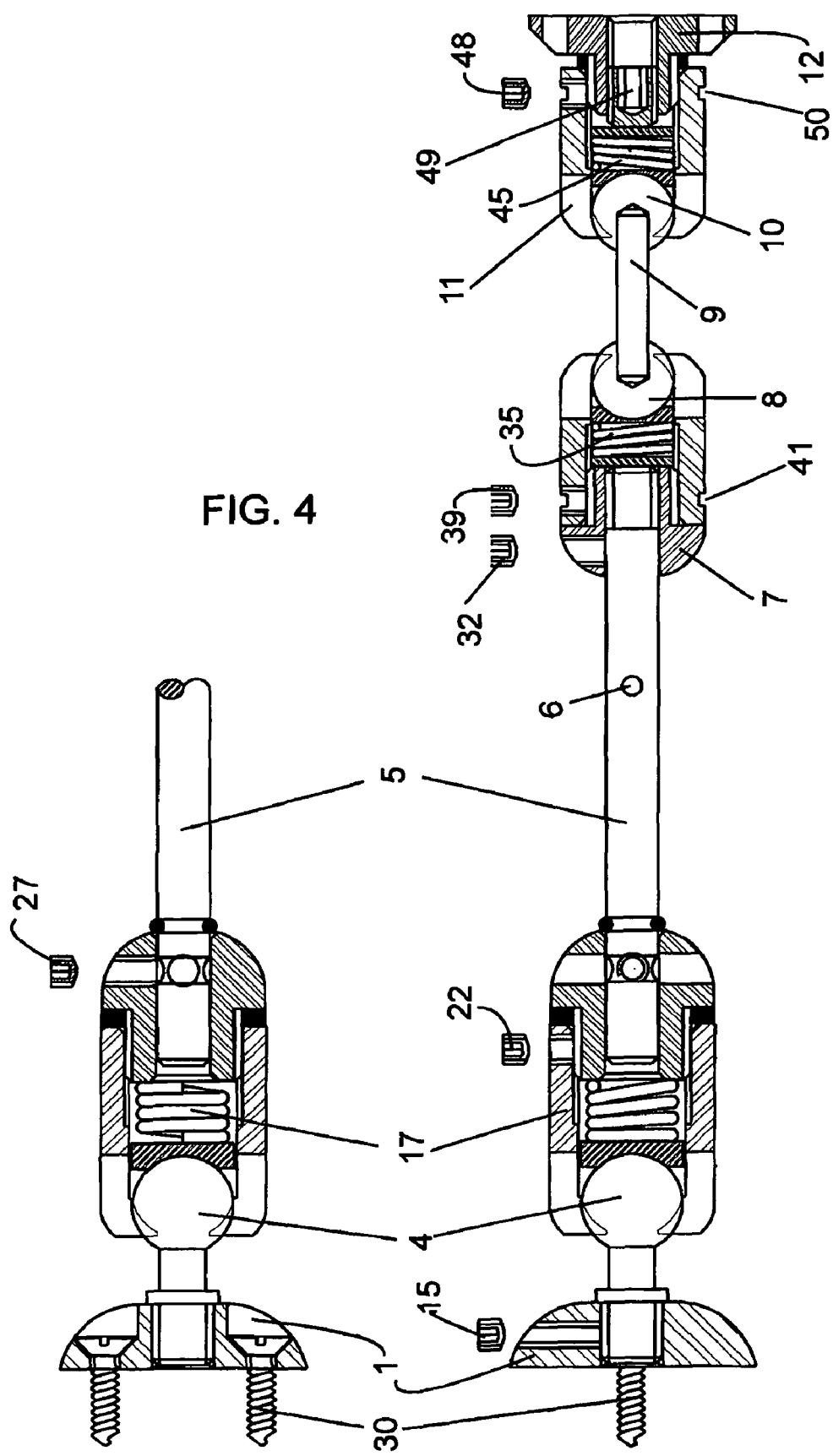
FIG. 4 is a longitudinal section drawing of the assembled mechanical arm.

FIG. 2 shows a detailed exploded view of the mechanical arm components from which one can infer the jointing way of the mechanical arm. The fixed base (1) constituting the portion to be fixed to a surface carries a connecting screw (14) (anchored by way of an Allen screw (15) into a threaded hole (16)) after passing-over the body of the ball joint (2) wherein a ball (4) remains locked between fingers formed by way of the slots (3). The pressure which keeps ball (4) in place determining the relative resistance to be moved comes from the spiral spring (17) acting over a disc or concave seat (18) where the ball (4) rests. In order to close the body of the ball joint (2) and complementary thereof, a cap (19) is provided which joints threadedly in such body of ball joint (2) together a supplementary washer (20). In order to prevent the cap (19)

rotates during use of the mechanical arm, the joint ball body (2) comprises a threaded hole (21) to insert an allen screw (22) which will intersect the thread of cap (19) preventing to rotate.

The spring (17) compression force adjustment and consequently, the relative movement displacement of the ball joint (2), is controlled through the cap (19). This cap (19) can enter or come out rotating on the thread to provide more or less pressure against the spring (17) and adjusting the ball (4) mobility strength degree. As stated, the selected position and movement adjustment force is performed by way of a screw (22) which will block the thread. A hole (23) permits insertion of a cap (19) adjusting lever. A toroidal ring or "O" ring (24) rests on a perimetric slot (25), operating as a limit on the major rod (5) and cap (19), leaving in position the slot (26) concurrently with the locking screw (27).

Upon considering that the pressure change operation on the ball joint (2) implies necessarily a rotation of the mechanical arm remaining positions respective to the same ball joint (2), it is required to align again the assembly to its initial position. This alignment is achieved by loosening the blocking screw (27) entering slot (26), rotating the remaining parts of the mechanical arm to its original position and after tightening said blocking screw.

Thus, after loosening the screw (27) of the hole (28) and the subsequent tightening, is possible to rotate the rod (5) in a specific point for a better operation. In the same way, a threaded hole (23) has a similar function, complementary to the one with the hole (28). A toroidal ring or O-ring fixes in a perimetric slot (25).

The ring (20) is an elastic ring intended to fill the gap between the ball joint (2) and the cap (19), additional to provide a decorative function.

A similar arrangement as the above explained for a second ball joint body (7), connected to the major rod (5) by way of the cap (31), where the corresponding end of such rod (5) threads and stays locked through the screw (32) received into the threaded hole (33). The remaining pieces (disc (34), spring (35), concave disc (36), ring (37), threaded pass-over hole (38) and Allen screw (39)) together a spherical body (8) and bar (9) carry out identical compression and adjustment functions above defined for the ball joint body (2). The elastic material ring (37) is used to, once stretched, seat into hole (41), to hide a screw (39), preventing a not required handling of the screw (39)

The ball joint body (11) which shares a minor rod (9) is jointed to its own spherical body (10) and comprise similar elements as a elastic ring (43), a concave disc (44), a spring (45), a push disc (46) and a base (12), which operates as a cap for such ball joint (11), as well as a threaded pass-over hole (47) and a screw (48). Difference in this case is the way to adjust the ball joint which is performed with the adjusting Allen screw (49) axially threaded on the mobile base (12); this arrangement permits to reach the disc (46) which should pressure the spring (45), disc (44) and finally the ball or spherical body (10). In the same manner as above stated, the ring (43) is designed to fill the slot (50), hiding the screw (48).

The ring (55) is an elastic ring intended to fill the gap between the ball joint (11) and the mobile base (12)

A telephone cellular support is fixed to the cellular support (13) (or other auxiliary accessory, according to the case) using rivets (51) and (52) being anchored on such mobile base (12) through holes (53) and (54), respectively. An adjustment of said blocking screw is carried out using an Allen wrench through the pass-over hole coinciding to such locking screw (48).

It is evident from the above explanation that the three ball joint assembly in the arrangement as described, permits movement at any spatial direction, including ball joint rotation on its own axis, to reach any point inside its action field, from the plan where is supported the static base (1) up to its maximum extent, that is, over 180° roundabout and at any angle including any intermediate point comprised into such semi-spherical volume which exceeds the required movement necessities for a cellular telephone or to other device or tool, if that is the case.

Figure 5:
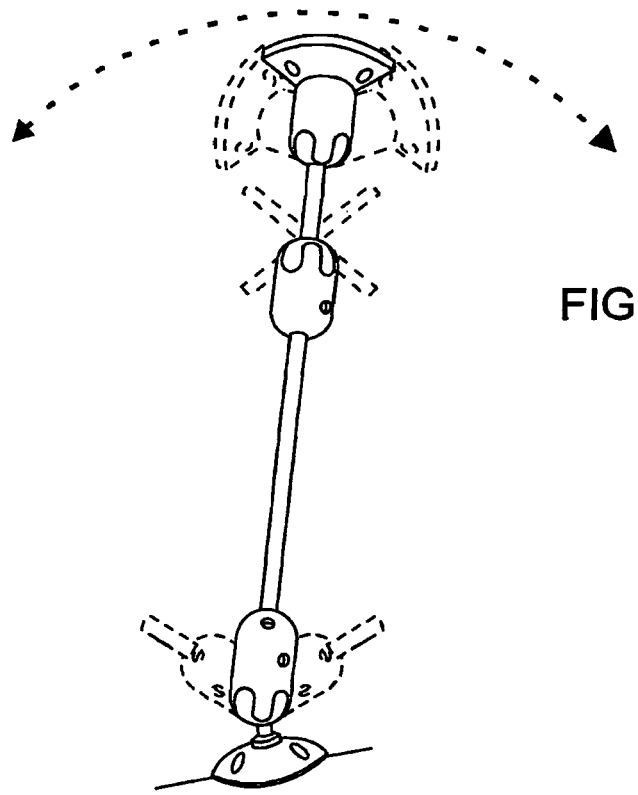
FIG. 5 is an illustration, very schematic, suggesting some of multiple space positions which can be obtained with the mechanical arm.
Figure 6:
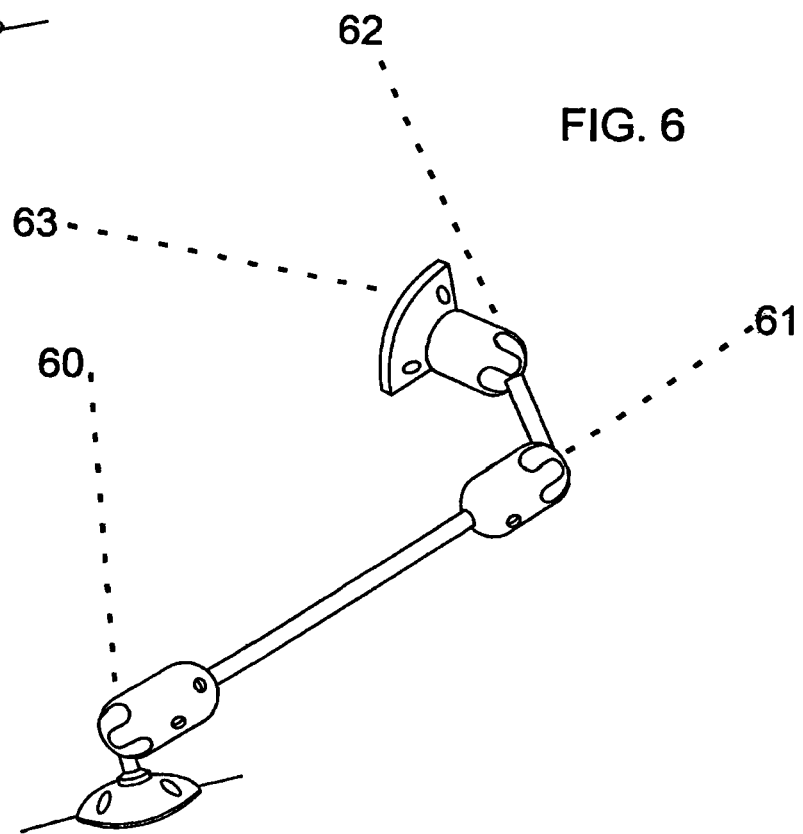
FIG. 6 is an illustration showing, through phantom lines, variations on orientations of the two different mechanical arm rods
Figure 7:
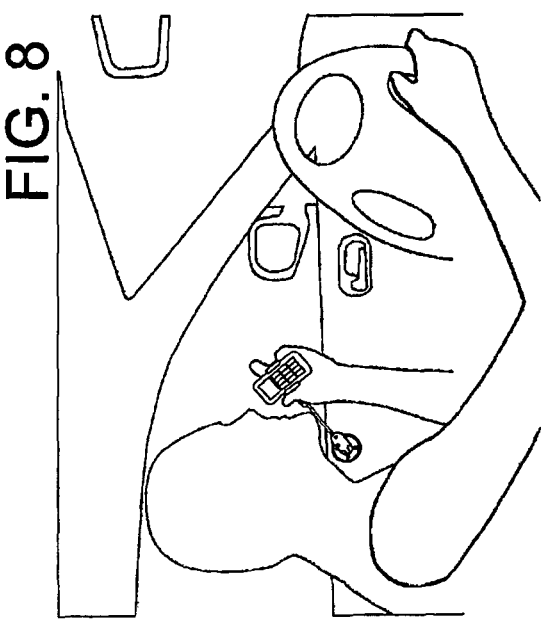
FIGS. 7, 8 and 9 are illustrative sequences wherein can be appreciated the several movements permitting a user to carry a cellular telephone from a rest position up to a reception position.
Figure 8:
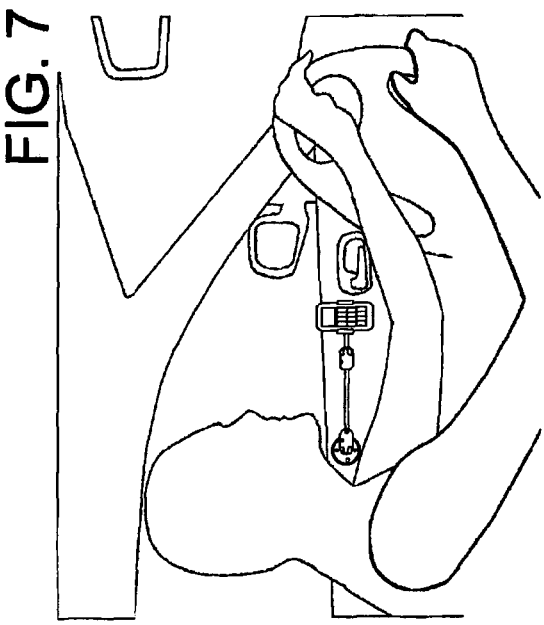
Figure 9:
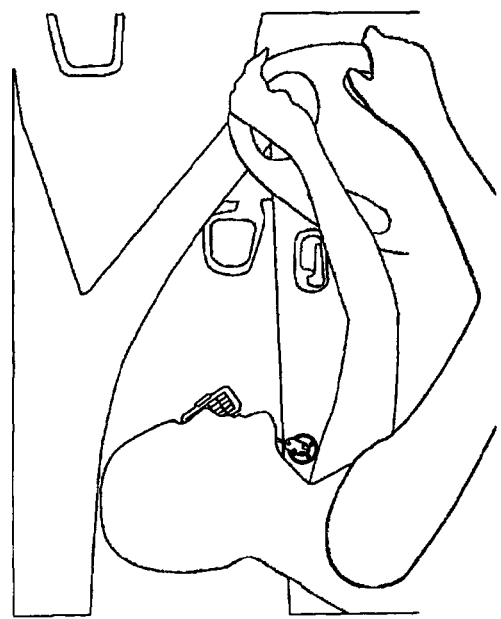
Figure 10:
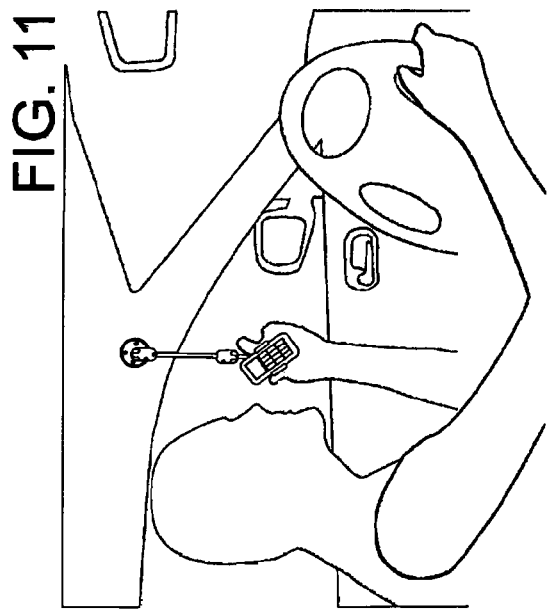
FIGS. 10, 11, and 12 are illustrative sequences similar to those shown on FIGS. 5, 6 and 7 showing a variation on the mechanical arm positions.
Figure 11:
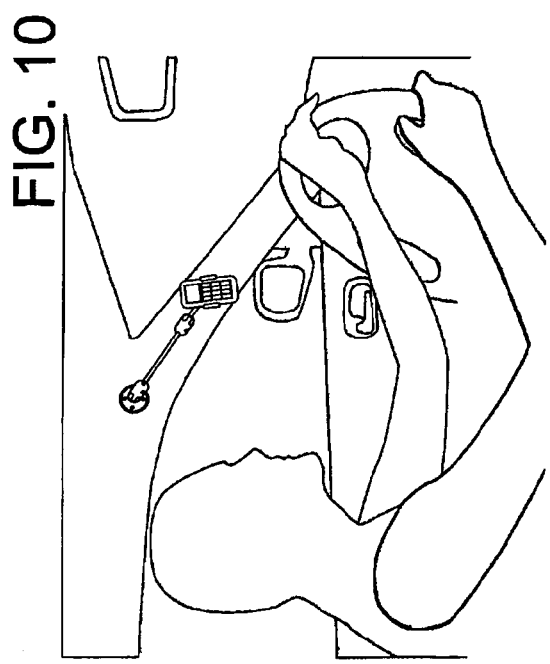
Figure 12:
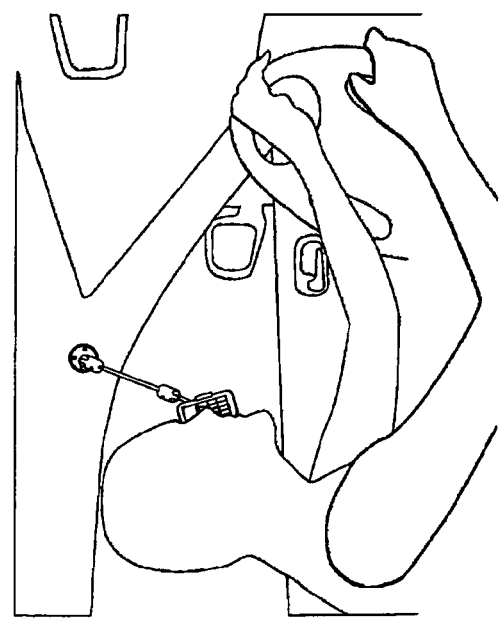

FIGS. 5 and 6 show this movement feature. FIG. 5 suggests (with phantom lines) some multiple positions on each ball joint as well as the extent of the assembly at its maximum length inside the semi-spherical space (shown with a discontinuous curve line) becoming possible an access to any place inside any radius and angle comprised between the origin base and the discontinuous curve line (which in practice is a semi-spherical virtual dome). This last feature can be seen better at FIG. 6, wherein from a direction (60), changed to a position (61), next changed to a position (62), it is possible to reach a position (63) inside the virtual space of the semi-spherical dome determined by the device action radius.

The invention claimed is:

1. A multi-directional mechanical jointed arm for supporting and suspending articles, to be used as a free hand accessory, wherein the arm comprises at least three ball joint wherein the first and the second ball joints are joined each other through a major rod, which one end is jointed to a first ball joint comprising a fixed base and the other end is jointed to a second ball joint, which in turn is connected, by way of a minor rod, to a third ball joint connected to a mobile base operating as a support for a free hand article; and wherein the first ball joint is further connected to the second ball joint in a fixed way through the major intermediate rod which due to rotation over its own axis with a lever arm permits to adjust pressures on internal ball joint springs of the second ball joint to maintain a mobile adjustment nearer to a fixed position.

2. A mechanical arm, according to claim 1, wherein the movement between the first ball joint and the mobile base arises to 90° or more on any direction, wherein such movement is defined by the angular rotation of the major rod jointed both the ball of the ball joint and the mobile base.

3. A mechanical arm, according to claim 1, wherein said major rod can be adjusted to control axially the spring pressures by loosening Allen screws which keep such rod in position being said screws on the ball joint caps and once the required pressure is reached such screws are tightened again.

4. A device, according to claim 1, wherein each one of the ball joints comprises, internally, a concave disc to seat the spherical body and a spring behind said disc to provide pressure, adjustable, as required to keep each ball joint at the selected position.

5. A mechanical arm, according to claim 1, wherein pressure on the first ball joint is adjusted by way of a cap of said first ball joint, the second ball joint is adjusted by way of the threaded pitch of the major rod and the third ball joint is adjusted by way of an Allen screw embedded axially an passing over through the fixed base.

6. A mechanical arm, according to claim 5, wherein between the cap and the main body of the first ball joint is placed an elastic ring which permits both the flexible adjustment and filling the gap between them.

7. A mechanical arm, according to claim 1, wherein the three ball joints combined movements can reach through the mobile base, any place inside a virtual dome formed into the mechanical arm action field.

8. A device, according to claim 1, wherein an accessory or in particular a cellular telephone mounted on said device, can be led from a plied or resting position up to a selected position and in the case of a cellular telephone, up to a position adjacent to an ear in suspended and stable condition, once the selected position has been reached.

* * * * *

UNITED STATES PATENT AND TRADEMARK OFFICE
CERTIFICATE OF CORRECTION

PATENT NO. : 7,753,330 B2 Page 1 of 1
APPLICATION NO. : 11/992857
DATED : July 13, 2010
INVENTOR(S) : Yancu Solomovitz Brief It is certified that error appears in the above-identified patent and that said Letters Patent is hereby corrected as shown below:

Title page, item [54] and col. 1, in the Title:

Change "ADJUSTABLE ARTICULATED ARM FOR CELLULAR STANDS FOR USE IN VEHICLES" to:

--ADJUSTABLE ARTICULATED ARM FOR CELLULAR STANDS FOR HANDS-FREE USE IN VEHICLES--

Signed and Sealed this

Thirty-first Day of August, 2010

David J. Kappos
*Director of the United States Patent and Trademark Office*